United States Patent [19]

Corbin, Jr.

[11] 4,053,643
[45] Oct. 11, 1977

[54] PROCESS FOR INCREASING CHEESE CURD YIELD

[75] Inventor: Edgar A. Corbin, Jr., Manchester, Mo.

[73] Assignee: Diamond Shamrock Corporation, Cleveland, Ohio

[21] Appl. No.: 711,606

[22] Filed: Aug. 4, 1976

[51] Int. Cl.² .............................................. A23C 19/02
[52] U.S. Cl. ...................................... 426/40; 426/36; 426/39; 426/42
[58] Field of Search ..................... 426/36, 39, 40, 41, 426/580, 582, 583, 656; 260/112 R, 122

[56] References Cited

U.S. PATENT DOCUMENTS

| | | | |
|---|---|---|---|
| 3,316,098 | 4/1967 | Noznick et al. | 426/40 |
| 3,706,575 | 12/1972 | Broadhead | 426/580 X |
| 3,882,250 | 5/1975 | Loter et al. | 426/40 X |

FOREIGN PATENT DOCUMENTS 46-6,813  2/1971  Japan

OTHER PUBLICATIONS

Briggs, D. R., The Metaphosphoric Acid–Protein Reaction, J. of Biol. Chem., vol. 134, 1940 (pp. 261–272).

*Primary Examiner*—David M. Naff
*Attorney, Agent, or Firm*—Neal T. Levin; Leslie G. Nunn

[57] ABSTRACT

Curd yield in cheesemaking is improved by forming a whey protein-condensed phosphate complex which remains in the curd when whey is separated. The complex is formed by adding a condensed phosphate to milk before or after acidification. Useful phosphates include sodium polyphosphate and potassium polymetaphosphate.

11 Claims, No Drawings

PROCESS FOR INCREASING CHEESE CURD YIELD

BACKGROUND OF THE INVENTION

1. Field of the Invention

This invention relates to a process for improving the yield of acid cheese cure in cheesemaking.

2. Description of the Prior Art

U.S. Pat. No. 3,039,879 — Vakaleris, describes a process for increasing the yield of solids from milk during cottage cheese manufacture by retaining additional protein in the curd. Milk is heat treated at high temperatures between 127° C to about 149° C for short periods of time to denature the milk protein and immediately cooled. Between 40 and 80% of the protein is denatured. Denaturation in excess of 80% of the protein results in browning, cooked flavor and adverse conditioning of the protein so care must be taken during heat treating. The cooled, heat treated milk is converted into cottage cheese curd by setting the milk with lactic acid starter and rennin and then cutting the curd.

The prior art also describes various processes for recovery of soluble protein from milk whey. U.S. Pat. No. 2,377,624 — Gordon, issued Apr. 5, 1945, discloses a process which involves acidifying milk whey to a pH of 1.0 to 4.3 and then adding condensed phosphates to precipitate the protein from the whey. This process has several disadvantages. For example, specific gravity of the precipitated protein is not sufficiently high to permit its separation from the water phase using commerically available equipment. Protein separation is also complicated by its low concentration, i.e., about 0.5 to 0.6 parts by weight of soluble protein per 100 parts by weight of whey.

Canadian Pat. No. 790,580 — Wingerd, issued July 23, 1968 describes a milk protein phosphate reaction product obtained by acidifying whey, then denaturing the protein in the acidified whey by heat treating, thereafter adding a solution of potassium polyphosphate and a sodium salt solubilizer to precipitate the denatured protein from the whey and separating the precipitated protein reaction product by centrifuging or filtering.

U.S. Pat. No. 3,864,506 — Grindstaff et at., issued Feb. 4, 1975 describes treatment of cheese whey with a condensed phosphate at a pH of 5.5 to 4.0, then adjusting the pH to 6.5 to 8.0 with base to precipitate the protein and separating the precipitated protein from whey by filtration.

It will be noted that none of the above processes using condensed phosphate is concerned with precipitation of protein in the curd during cheesemaking but in the separation of protein from milk whey after they whey has been separated from the curd.

SUMMARY OF THE INVENTION

A condensed phosphate salt is added in sufficient amount to increase the yield of cheese curd by complexing milk protein in milk before or after acidification, the pH after acidification being from about 4.95 to about 5.3 and the temperature before and after acidification being from about 5° C to about 40° C. The condensed phosphate salt forms complexes with whey proteins so the proteins remain in the curd and are not removed with the whey. If desired, orthophosphate salts and alkaline earth halides may be added as buffers.

Temperature of the acidified milk and condensed phosphate salt mixture is then adjusted to from about 26° C to about 40° C and maintained at a temperature of from 26° C to about 40° C during addition of from about 0 to about 0.5 parts by weight of acidogen with the preferred amount being about 0.2 to about 0.5 parts by weight of acidogen and from about 0.01 parts to about 0.05 parts by weight of proteolytic enzyme per 100 parts by weight of acidified milk. This mixture is then allowed to remain quiescent at a temperature of from about 26° C to about 40° C for from about 45 minutes to about 2 hours to form an acid cheese curd suitable for making cottage cheese, bakers's cheese, quark cheese, cream chesse and Neufchatel cheese.

DESCRIPTION OF THE PREFERRED EMBODIMENTS

The fluid milk used in this invention may be a reconstituted powdered milk or fluid milk product such as fresh skim milk, skim milk having about 1–4 percent by weight or more added NFMS (Grade A, Low Heat, non-fat-milk-solids), whole milk, milk-cream mixtures, half milk and half cream, reconstituted condensed milk and the like. The fluid milk may be obtained by reconstitution of powdered milk with water or a fluid milk. It is to be understood that fluid milk products may include medium and high butter fat milk or cream having as much as 20 percent butterfat as well as milk having butter fat contents of from about 0.01% to about 5% by weight and a total nonfat solids content of from about 8% to about 16% by weight.

The condensed phosphates used in this invention include the pyro-, meta-, poly- and ultraphosphates. Generically, the term encompasses all phosphates derived from acids containing less water than orthophosphoric acid ($3H_2O.P_2O_5$). Pyro-, meta- and polyphosphates are also called "molecularly dehydrated" phosphates because they can be prepared by a common procedure, dehydration of acid orthophosphates. Useful food grade "condensed phosphates" include:

1. Potassium polymetaphosphate also known as potassium meta- phosphate and potassium Kurrol's Salt has the formula $(KPO_3)x$ and is a straight chain polyphosphate having a high degree of polymerization. It occurs as a white, odorless powder which is insoluble in water but is soluble in dilute solutions of sodium salts.

2. Potassium pyrophosphate also known as tetrapotassium pyrophosphate has the formula $K_4P_2O_7$ and a molecular weight of 330.34. It occurs as colorless crystals or white, granular solid. Potassium pyrophosphate is hygroscopic and very soluble in water but insoluble in alcohol. A 1 in 100 solution has a pH of about 10.5.

3. Potassium tripolyphosphate also known as pentapotassium triphosphate and potassium triphosphate has the formula $K_5P_3O_{10}$ and a molecular weight of 448.42. It occurs as white granules or a white powder. Potassium tripolyphosphate is hygroscopic and is very soluble in water. A 1 in 100 solution has a pH of between 9.2 and 10.1.

4. Sodium acid pyrophosphate also known as disodium pyrophosphate and disodium dihydrogen pyrophosphate has the formula $Na_2H_2P_2O_7$ and a molecular weight of 221.94. It occurs as a freely water soluble, white fused mass or free-flowing powder. A 1 in 100 solution has a pH of about 4.

5. Sodium polyphosphate also known as sodium metaphosphate; glassy sodium phosphate; sodium hexametaphosphate; sodium tetraphosphate; Graham's Salt; Kurrol's Salt; sodium trimetaphosphate; sodium tetrametaphosphate and insoluble sodium metaphosphate. The food grades include crystalline or amorphous commerical phosphates whose compositions range from $(NaPO_3)_x$ through $Na_xH_2P_xO_{3x+1}$ to $Na_{3x+2}P_xO_{3x+1}$. These phosphates are usually identified by the $P_2O_5$ content or by the $Na_2O/P_2O_5$ ratio. They occur as colorless, glassy, transparent platelets, granules or powders. Except for insoluble sodium metaphosphate, they are hygroscopic, water soluble compositions.

The following three classes of sodium metaphosphate are available commercially:

Class A. Amorphous sodium polyphosphate, often referred to as "sodium hexametaphosphate," has an $Na_2O/P_2O_5$ mole ratio of about 1.1. A 1 in 100 solution has a pH of about 7.

Class B. Amorphous sodium polyphosphate, often referred to as "sodium tetraphosphate," has an $Na_2O/P_2O_5$ mole ratio of about 1.3. A 1 in 100 solution has a pH of about 7.8.

Class C. The amorphous and crystalline metaphosphates have an $Na_2O/P_2O_5$ mole ratio of 1. A 1 in 100 solution has a pH of about 6.0.

6. Sodium pyrophosphate also known as tetrasodium diphosphate and tetrasodium pyrophosphate has the formula $Na_4P_2O_7$ and a molecular weight of 265.90. It is anhydrous or contains 10 molecules of water of hydration and occurs as a white, crystalline or granular powder. The decahydrate effloresces slightly in dry air. Sodium pyrophosphate is soluble in water but insoluble in alcohol. A 1 in 100 solution has a pH of about 10.

7. Sodium tripolyphosphate also known as pentasodium triphosphate; triphosphate and sodium triphosphate has the formula $Na_5P_3O_{10}$ and a molecular weight of 367.86. It is anhydrous or contains 6 molecules of water of hydration. Sodium tripolyphosphate occurs as white, slightly hygroscopic granules or as powder. It is freely soluble in water. A 1 in 100 solution has a pH of about 9.5.

Orthophosphate salts such as monocalcium phosphate, monosodium phosphate, monoammonium phosphate, disodium phosphate or the like may be added as buffer to the fluid milk before or after acidification.

The fluid milk may be acidified with a 10-90% by weight aqueous solution of a food grade free acid such as lactic acid, phosphoric acid, citric acid, acetic acid, malic acid, sulfuric acid, hydrochloric acid, tartaric acid, adipic acid, glutaric acid, fumaric acid, glutaric anhydride, succinic acid or the like. Acidification may be at a temperature of above 0° C to about 30° C with the preferred temperature being about 20° C to about 30° C to obtain a pH of about 4.95 to about 5.30 with the preferred pH being about 5.00 to about 5.20. The acid must be added in such a way that the milk is acidified to the desired pH at the desired temperature without precipitation of casein or any alteration that will prevent curd formation in this process. The teachings relating to useful milk acidification methods described in U.S. Pat. No. 3,882,250 — Loter et al, issued May 6, 1975 and U.S. Pat. No. 3,620,768— Corbin issued Nov. 16, 1971, are incorporated by reference herein. Further, if desired, an acidified powdered milk such as describe in my co-pending application titled "Cheese Manufacture," U.S. Ser. No. 711,605, filed on Aug. 4, 1976 may be used.

A primary factor in successful acidification of milk is the avoidance of casein precipitation (acid coagulation) caused by excessive local acidity. Depending upon the conditions under which the milk is to be processed, various methods of acidification can be used. For example, acidification can be successfully carried out in the laboratory using a small amount of milk under rapid agitation, such as in a blender, with concentrated acid such as 85 percent phosphoric being added directly into the milk container a drop at a time from a pipette. This is impractical in practice where it has been found that the best means of acidifying the milk for commerical production is to introduce diluted acid into a stream of milk recirculating in a pipe at a uniform rate while constantly reading the milk pH from a meter inserted in the pipeline beyond the point of introduction or in the vat. Acid can be introduced by any conventional metering device or can be drawn into the recirculating pipe using a standard Bernoulli connection, in which case the diameter of the connecting tube will determine the acid addition rate.

A change in any of the acidification variables can be easily compensated for by adjusting other variables. For example, if the milk temperature is at the low end of the range (slightly above 0° C), a more concentrated acid solution can be introduced, or the acid addition rate increased, or both of these factors varied. All of these factors may be varied within the limits of this invention up to the point where casein begins to precipitate. Taking another example, if the acid is introduced cold at a 10 percent dilution, then it can be introduced into the milk more rapidly, or it can be introduced at a higher temperature (approaching 30° C), or both of these latter factors can be varied as indicated, but to a lesser degree.

After acidification, the milk may be maintained at about the same temperature and from about 0.2 to about 0.5 parts by weight of at least one acidogen based on 100 parts by weight of acidified milk, and from about 0.01 to about 0.05 parts by weight of aqueous proteolytic enzyme solution based on 100 parts by weight of acidified milk are added to the milk. The resulting mixture is agitated during and after acidogen and enzyme addition until uniform. The acidified milk is then maintained at about the same temperature while quiescent until the acid liberated from the acidogen and the action of the proteolytic enzyme both bring about coagulation of the milk. It takes from about 45 minutes to about 2 hours after addition of the acidogen and proteolytic enzyme for a cuttable cheese curd to form.

An acidogen such as D-glucono-delta-lactone, the low melting lactide (m.p. 41°–42° C) of lactic acid, acetic anhydride, heptonolactone (the lactone of glucoheptonic acid) or the like can be used. Preparation of this low melting lactic acid lactide is described in U.S. Pat. No. 2,982,654— Hammond and Deane, issued May 2, 1961.

The proteolytic enzyme can be commerical rennin, Rennet, a diluted rennet extract, a pepsin-rennin mixture, a vegetalbe-derived enzyme clotting agent or the like. Other enzymes such as pepsin, papain and ficin may be used along or in combination with rennin, the preferred enzyme. Rennin is obtained from the stomach of suckling calves. Rennet, a commerical dried extract containing rennin can also be used. See Merck Index, page 911 (Merck & Co., Inc. —1968—8th ED). The Rennet of commerce is usually a solution of the enzyme rennin, stabilized, and with preservatives added and standarized in strength to a certain coagulating or clotting power. Useful commerical aqueous rennin solutions include Hansen's Rennet Extract and Hansen's Cottage Cheese Coagulator available from Hansen's Laboratory, Inc., Milwaukee, Wis. Another enzyme that may be used is produced by pure culture fermentation of the organism Mucor Miehei. This enzyme is available commercially in units standarized to rennet extract.

The heated, acidified milk contaning acidogen and enzyme is then allowed to remain in a quiescent state at just in excess of 16° C to about 41° C with the optimum temperature being about 27° C to 32° C for about 45 minutes to about 120 minutes to obtain a cuttable cheese curd.

The cheese curd is then cut and cooked. It can be cut into large (¾-inch, ⅝-inch, ½-inch) or small (⅜-inch or ¼-inch) cubes. The cooking rate in the process of this invention is faster than the cooking rate in the cultured process, that is, about 30 minutes to about 90 minutes compared to about 90 minutes to about 150 minutes. Draining and washing of the cooked curd can be carried out using conventional cheesemaking procedures.

To produce cottage cheese, the acid cheese curd is processed with the additional steps of:
1. cutting the curd into cubes,
2. expressing the whey from the curd,
3. cooking and stirring the curd for from about 30 minutes to about 90 minutes at a temperature of from about 38° C to about 65° C, and
4. washing and draining the curd.

To prepare baker's cheese, the acid cheese curd is processed with the additional steps of:
1. breaking up the curd,
2. bagging the curd and expressing the whey, and
3. hanging and draining the bagged curd for about 1 hour, to express further whey.

To produce Neufchatel cheese or cream cheese, the acid cheese curd is processed with the additional steps of:
1. cutting the curd,
2. cooking and stirring the curd until the temperature reaches about 55° C and then continuing cooking for about 15 additional minutes,
3. cooling the curd to about 15° C,
4. draining the curd overnight at about 3°–4° C to obtain a dry, soft curd,
5. mixing the dry, soft curd with sufficient lactic acid to reduce the pH of the curd to 4.60, and
6. blending the curd into a smooth homogeneous cheese mass.

In cream cheese manufacture, the original milk should contain enough cream so as to have a fat content of about 10.5 to about 11.5 percent. In making Neufchatel cheese, the original milk should contain enough cream so as to have a fat content of about 5 to about 6 percent.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g, ml, ° C, ° F and NFMS are used to indicate grams, milliliters, degrees Centigrade, degrees Fahrenheit and non-fat-milk-solids respectively in these examples.

EXAMPLE I

This example demonstrates preparation of cottage cheese curd using sodium polyphosphate.

Added 256.25 lb pasteurized skim milk to cheese vat. Milk temperature was 3° C and pH was 6.77. Total solids in the skim milk was 9.2% by weight. Then added 290ml of 85% phosphoric acid in increments to the milk with vigorous stirring to reduce pH of the skim milk to 5.14.

Warmed acidified skim milk to 18.3° C and added 95 g monocalcium phosphate and 368 g sodium polyphosphate ("Vitrafos"— Stauffer Chemical Co.). Continued warming skim milk to 38° C where the milk pH was 5.10.

Added 408 g D-glucono-delta-lactone as the acidogen and stirred for 2 min and then 36 ml cottage cheese coagulator (dilute rennet extract, Hansen's) diluted in 150 ml water to the heated acidified milk. Stirred for 2 min. The heated acidified skim milk had a pH of 4.99.

Allowed milk to stand undisturbed for 1 hr. At the end of the hour, the milk formed a very firm, normal, cottage cheese curd. This curd was cut with ⅜ inch wire knives. Cut was clean, smooth, normal. The whey had a pH of 4.73.

Allowed the cut curd to set to "heal" 15 min, then added 10 ml of 85% phosphoric acid diluted with 1 pint warm water to the cut curd. Stirred the cut curd gently and cooked slowly to 41° C in ½ hr, then to 44° C in 45 min, thereafter to 51° C in 1 hr and then to a final temperature of 60° C in a total of 75 min. Curds were soft but "meaty" and were uniformly cooked throughout.

Drained whey, washed the curd 3 times with water, trenched in vat and allowed to drain for 30 min. Weight of drained curd was 56.75 lb. Moisture in curd was 84.2%. Weight of curd calculated to the legal 80% moisture was 44.8 lb. Curd yield was 17.5% based on weight of skim milk, or 1.90 lb curd per 1 lb solids in the skim milk. These values were well above average yields when compared to average yield figures from "Practical Cheesemaking," G. H. Wilster, O.S.U. Book Stores, Inc. (12th Ed. 1974), Corvallis, Oreg., which on page V-14, reports that milk having 9% skim solids gave a good yield of 14–16% based on total weight of skim milk or 1.66 lbs curd per lb NFMS (based on 15% yield, 9% NFMS).

EXAMPLE II

This example demonstrates preparation of cheese curd using polyphosphates and a pre-acidified skim milk powder.

Charged 30 gal of water having a pH of 9.3 into a cheese vat. Then added 144 g monosodium phosphate, 84 g monocalcium phosphate, 360 g sodium polyphosphate ("Vitrafos"—Stauffer Chemical Co. ), and 24 ml of an antifoam solution to the water. Water pH after this addition was 5.85. Added 15 pounds of NFMS (non-fat-milk-solids —powdered skim milk solids) to the water using a recirculating, powder funnel system, to reconstitute the skim milk. Reconstituted milk had a pH of 6.3.

A pre-acidified skim milk powder was prepared by intimately mixing the following finely ground food-grade acids with a second 15 pound portion of NFMS: 120 g tartaric acid, 120 g citric acid, 72 g malic acid and 84 g adipic acid. The pre-acidified skim milk powder was reconstituted using the reconstituted skim milk prepared in the preceding paragraph at 18° C and thy powder funnel system, to obtain a skim milk having approximately 10.7% solids. The reconstituted acidified skim milk pH was 5.11. The skim milk was then warmed, with agitation, from 18° C to 36° C where its pH was 5.09.

The small amount of denatured foam present on the surface of the reconstituted acidified skim milk was removed and discarded. A one quart sample of the acidified skim milk was set aside for 30 min and then carefully decanted. There was no sediment present in the sample and no specks of precipitated casein were found in the sample.

Added, with stirring, to the vat of heated acidified milk, 480 g of acidogen (D-glucono-delta-lactone) and stirred for 2 min. Then added, with stirring, to the vat, 36 ml cottage cheese coagulator (dilute rennet extract, Hansen's) diluted in 200 ml water and stirred for 2 min. Milk pH was 5.05.

Allowed acidified skim milk to set undisturbed for 1 hr. A normal, firm, cottage cheese type curd formed. The curd was cut with ⅜ inch wire knives. Cut was very clean, smooth and normal. Whey exuded from curd normally. Whey pH was 4.85. Curd was allowed to set for 15 minutes to "heal" and 30 ml of 85% phosphoric acid diluted with 1 qt warm water was added to the cut curd. Then stirred the cut curd gently and cooked cured slowly to 52° C. The cooked curd was slightly soft, but was an acceptable large curd type cottage cheese curd. Whey pH was 4.62. Drained whey, washed curd 3 times with water, trenched curd and drained for 30 min.

Weight of drained curd was 56.75 lbs. Yield, based on 280 lbs skim milk was 20.27% or 1.89 lbs of curd per each 1 lb of NFMS used. Moisture in the curd was 79.4% (80% is legal maximum). Weight of the curd calculated to an 80% moisture level was 58.45 lb. Yield of curd was 20.87% or 1.95 lb of curd per each 1 lb of NFMS (powdered skim milk) used.

EXAMPLE III

To two quarts of commercial pasteurized skim milk (1950 g) having a pH of 6.70 and a temperature of 4° C were added with mechanical agitation, 4.7 ml of 85% phosphoric acid (undiluted) drop wise to reduce the milk pH to 5.02. The milk pH remained unchanged on warming to 13° C. Then 4.5 g of sodium polyphosphate ("Vitrafos", Stauffer Chemical Co.) was added and dissolved in the milk by stirring for about 1 min to obtain an acidified milk having a pH of 5.09. The acidified skim milk was warmed to 33° C where its pH was 5.22.

A solution of 8 g of D-glucono-delta-lactone dissolved in 20 ml of water was added to the warm skim milk and mixed by stirring for 1 min. Then 0.45 ml standard strength cottage cheese coagulator (dilute rennet extract, Hansen's) diluted with 5 ml water was added to the warm milk and mixed by stirring for an additional 1 min.

Agitation of the acidified milk, lactone and coagulator mixture was then discontinued and the mixture allowed to stand undisturbed at 33° C for 2 hr to form a cottage cheese type curd which was cut into small ⅜ inch cubes. The cubes were allowed to settle and "heal" for 30 min while whey having a pH of 4.53 exuded normally. The cut curd cubes were then heated externally using a hot water bath while they were stirred and cooked to 54° C. No matting of the curd cubes occurred during cooking but there was some slight break-up of the cubes with some "fines" being formed.

Whey having a pH of 4.45 was drained from the cubes. The curd cubes were then washed 3 times with successively colder water washes, drained after each wash, transferred to a cheesecloth bag and drained for the last time. The drain curd weighed 345 g and had a moisture content of 80%. The dry curd yield was 17.7%. The skim milk contained about 9% solids giving a solids recovery yield of 1.96 lbs dry curd per pound of skim milk solids.

The yield was above average.

EXAMPLE IV

A total of 30 gal (260.75 lb) of commercial pasturized skim milk having a total solids content of 9.2%, a temperature of 3° C and a pH of 6.7 was charged into a cheese vat. Then 200 ml of undiluted 85% phosphoric acid was slowly poured into skim milk and dispersed rapidly using hand-paddle agitation. The pH of the acidified skim milk was 5.44. An additional 50 ml of 85% phosphoric acid was stirred into acidified milk using the same procedure. After the second acid addition, the milk pH was 5.29.

The acidified skim milk was then warmed with stirring to 27° C and 70 g monocalcium phosphate 420 g sodium polyphosphate ("Vitrafos," Stauffer Chemical Co.) were added with stirring. Continued stirring and warmed the milk to 41° C where the milk had a stable, rich, creamy appearance and a pH of 5.30.

Added 408 g D-glucono-delta-lactone to the warmed, acidified milk and stirred for 2 min. Then added 45 ml cottage cheese coagulator (rennet extract, Hansen's) diluted with 200 ml water to the milk in the vat and stirred for 2 min. At this point, the skim milk pH was 5.21.

The milk was then allowed to stand undisturbed for 1 hr at 40° C and formed a medium firm, typical cottage cheese type curd. The curd was cut with ⅜ inch wire cheese knives. Allowed the cut curd cubes to set and "heal" for ½ hr. Whey having a pH of 4.92 exuded rapidly from the cubes. Circulated hot water through vat jacket while the curd cubes were cooked and stirred in the vat in usual manner while heating to 57° C over 1 hr. The cooked cubes were slightly soft.

Drained whey having a pH of 4.70 from the cubes. The cubes were then washed with 3 successively colder water washes; first wash was with 28° C water, second wash was with 14° C and third was with 3° C water. After the third wash, drained, trenched and then drained the trenched cubes for 30 min.

The drained curd cubes were slightly soft, but "meaty." There was no free whey inside of cubes. Weight of drained curd was 54.25 lb and the moisture content was 83.3%. Weight of curd cubes calculated to 80% moisture, was 45.3 lbs. Yield was 17.37% of 1.89 lb dry curd per pound of skim mild solids.

Yield was above average.

EXAMPLE V

A total of 30 gal (261.25 lb) of commercial pasteurized skim milk having a total solids of 9.25% by weight, a temperature of 3° C and a pH of 6.72, was charged into a cheese vat. Then added, with good agitation, 950 g instant non-fat-milk-solids (powdered skim milk). Total solids in the skim milk after the powdered milk addition was 10.4%. Using good hand-paddle agitation, 200 ml of undiluted 85% phosphoric acid were slowly poured into skim milk to reduce the pH to 5.25.

The acidified skim milk was warmed by circulating warm water through the jacket of the cheese vat. When the milk temperature reached 19° C, 10 g monocalcium phosphate and 475 g sodium polyphosphate ("Vitrafos," Stauffer Chemical Co.) were added with stirring. The stirred skim milk was warmed to 41° C. Appearance of milk at 41° C was rick, creamy, clean with no specks or foam and the pH was 5.25.

Then 408 g of D-glucono-delta-lactone was added with stirring to the warm milk and the milk was stirred for 2 min. Diluted 36 ml cottage cheese coagulator (dilute rennet extract, Hansen's) with 150 ml water and poured the diluted cheese coagulator into the milk and stirred for 2 min. At this point, the milk pH was 5.13. Then allowed skim milk to stand undisturbed for 1 hr at 41° C to form a firm cottage cheese type curd. Curd cut was very clean, and easy with ⅜ inch knives. Allowed cut curd cubes to "heal" for 15 minutes. Whey pH was 4.88. Added 10 ml of 85% phosphoric acid to 1 pt warm water and distributed the diluted acid over cut curd cubes. Then gently stirred the diluted acid into curd cubes and whey and allowed curd cubes to set another 10 min.

Circulated warm water through vat jacket. The curd cubes were stirred and cooked to 43° C over 20 min. Very little matting of curd and minimum shattering occurred during stirring and cooking. The cubes were cooked another 30 min to 52° C. They firmed slowly, were cooked another 10 min to 54° C and then drained. The whey pH was 4.67. The curd cubes were washed three times: first at 28° C, second wash at 10° C, third wash at 0.6° C. Trenched the curd cubes and then drained the cubes for 50 min.

Moisture in curd was 83.0%. Weight of curd calculated to 80% moisture was 51.21 lb. Yield based on 283.85 lb skim milk (261.25 lb starting skim plus 22.6 lb skim milk from the 950 g added skim milk powder) was 18.04%. Yield on total skim milk solids present (26.25 lb total non-fat milk solids) was 1.95 lb cured per pound of non-fat milk solids.

Yield was above average.

EXAMPLE VI

Two quarts of commercial skim milk having 9.2% total solids were warmed to 27° C. Then 2.4 g monoammonium phosphate, 2.4 g disodium phosphate, 1.2 g monocalcium phosphate, and 4.8 g sodium polyphosphate ("Vitrafos," Stauffer Chemical Co.) were added to the stirred warm milk. After the phosphate additions, the milk pH was 6.55. Then using vigorous mechanical agitation, 6 ml undiluted 85% phosphoric acid was added in 1 ml increments to the warm milk at 27° C. Skim milk pH after each 1 ml increment addition was: 6.23, 5.95, 5.68, 5.41, 5.16 and 4.94 respectively. There were no specks of precipitated protein present in the milk and the milk was normal in appearance.

The acidified skim milk was then warmed to 32° C. Milk pH at 32° C was 4.96. Then 6 g of D-glucono-delta-lactone was added with mechanical agitation and the mixture stirred for 1 min. Diluted 0.35 ml cottage cheese coagulator (dilute rennet extract, Hansen's) with 20 ml water, added the diluted coagulator to the skim milk and stirred the mixture for 1 min. After this addition, pH of the milk was 4.92.

The milk was then allowed to stand undisturbed for 65 min and formed cottage cheese type curd, which was slightly softer than normal, but acceptable. Curd was cut into ⅜ inch cubes which were allowed to "heal" 15 min, then cooked and stirred in usual manner to 49° C. Curd cubes shrunk and firmed satisfactorily. Drained whey from curd cubes, washed cubes 3 times with successively colder water and drained washed curds in a cheesecloth bag.

Weight of drained curd, adjusted to 80% moisture, was 373.7 g. Yield was 19.17% or 2.08 lbs of curd per pound of skim milk solids.

Yield was above normal.

EXAMPLE VII

Pasteurized skim milk (1850 gal having a total solids of 9.2%) was acidified in-line, at 8° C, by metering undiluted 85% phosphoric acid into the milk line leading to the cheese vat to obtain an acidified milk having a pH of 4.95.

The acidified skim milk was mechanically agitated and heated to 32° C by circulating warm water through the vat jacket. During heating, three 16 lb portions of sodium polyphosphate ("Vitrafos," Stauffer Chemical Co.) were added between 10° C and 16° C to the milk. On heating to 32° C, the skim milk had a pH of 5.2. A solution of 80 pounds of D-glucono-delta-lactone in 15 gal of water was prepared, poured into the acidified milk at 32° C and the mixture stirred for 4 min. Cottage cheese coagulator (dilute rennin solution) was prepared by diluting 23.5 fl oz of standard strength cottage cheese coagulator (dilute rennet extract, Hansen's), in 2 gal of water, poured into the acidified milk mixture and stirred for 3 min.

The skim milk was then allowed to set undisturbed at 32° C for 105 min and formed a normal cottage cheese curd. The curd was cut with ¼ inch wire knives and allowed to "heal" for 15 min. The whey had a pH of 4.65. Diluted 54 fl oz of 85% phosphoric acid with 2 gal of warm water and poured the diluted acid over the cut curd cubes which were then cooked and stirred in the usual manner to 49° C in 90 min.

Drained whey having a pH of 4.42 from the curd cubes. Then washed cubes with 3 successively colder water washes. Last wash was ice water containing 32 fl oz of a 50% citric acid solution. The curd cubes were set overnight in the acidified ice water wash and wash water was drained the next morning. The curd cubes were then piled, allowed to drain and shoveled into bulk containers where they were mixed with a preweighed amount of cream dressing.

Weight of dry curd obtained was 2790 lb having a moisture content of 77.19%. Calculated to an 80% moisture content, the dry curd weight would be 3182 lb. Dry curd yield was 20%, or on a solids basis, 2.17 lb curd per pound skim milk solids.

An equal volume of skim milk, from the same bulk tank, was made into cottage cheese by culturing with a bacterial starter, and no phosphate was added to the skim milk. Cheese curd obtained from this vat was 2403 lb after adjustment to an 80% moisture content. Yield of cultured curd was 15.1%, or on a solids basis, 1.64 lb curd per pound skim milk solids.

EXAMPLE VIII

This example demonstrates preparation of a polyphosphate baker's cheese product.

A 2 qt sample of commercial, pasteurized skim milk (1945 g), total solids of 8.4% was heated slowly to 59° C and then cooled to 5° C. The purpose of this second heat treatment was to modify the milk proteins to produce a softer curd which is desirable in baker's cheese.

Then 4.5 ml of undiluted 85% phosphoric acid was added with mechanical agitation to the 5° C milk. After acidification, the milk had a pH of 4.88 and no curdiness or precipitation of casein was observed. A total of 5.6 g of sodium polyphosphate ("Vitrafos," Stauffer Chemical Co.) was added to the acidified milk. After the polyphosphate addition, the pH was 4.98.

The acidified skim milk was warmed to 32° C and 5.6 g D-glucono-delta-lactone (acidogen) added. The mild was then stirred for one min and then 0.3 ml cottage cheese coagulator (dilute rennet extract, (Hansen's) diluted with 5 ml water was added to the skim milk. The milk was then stirred for 1 min and allowed to set undisturbed for 1 hr at 32° C. A very soft, smooth curd formed.

The curd was cuttable, but not a firm cut. The curd was broken up using a spatula and gentle mechanical stirring. The curd-whey mixture had a pH of 4.9. Then 0.75 ml 85% phosphoric acid was added and the curd stirred for 1 min. Whey pH was 4.65. The curd-whey mixture was filtered through coarse filter paper, then drained further in a cheesecloth bag, with slight pressure on bag to obtain an acceptable baker's cheese. Moisture in the curd was 73.0% and pH was 4.6. Weight of curd was 243 g. When calculated to an 80% moisture level, weight of curd was 328 g. A percentage yield of 16.8% did not appear to be high until the low solids content (8.4%) of the starting skim was considered. On a solids basis, the yield was 2.0 lbs curd per lb of solids, which is well above normal.

EXAMPLE IX

To 2 qt (1950 g) of commercial pasteurized skim milk having a total solids of 11.3% and a pH of 6.64 were added at 6° C:
- 2.4 g monoammonium phosphate
- 1.2 g monocalcium phosphate
- 2.4 g disodium phosphate
- 4.8 g sodium polyphosphate ("Vitrafos," Stauffer Chemical Co.).

After these additions, pH of milk was 6.42.

To 190 g of 85% phosphoric acid was added 30 g of potassium polymetaphosphate. The acid was warmed until the phosphate dissolved, then was cooled to room temperature to obtain a clear, syrupy, phosphoric acid-phosphate solution.

To the above 2 qt of skim milk was added at 11° C, 5.5 ml of the phosphoric acid-phosphate solution, slowly with vigorous mechanical agitation. The pH of the acidified skim milk was 5.0. No instability of the acidified milk was observed and no specks of precipitated casein were noted.

The acidified skim milk was then warmed to 33° C, with stirring, in a 41° C water bath. The pH of the warm milk was 5.13. Then added 0.9 ml cottage cheese coagulator (dilute rennet extract, Hansen's) diluted in 10 ml water and stirred for 2 min. The milk was allowed to set undisturbed for 1 hr at 33° C. A rather firm, cottage cheese type curd formed.

The curd was cut into ⅜ inch cubes, allowed to set and "heal" for 40 min. Whey pH was 5.15. Diluted 1 ml 85% phosphoric acid with 20 ml hot water and distributed the diluted acid over top of the cut curds. Whey pH was 4.82. The cut curds were cooked and stirred in usual manner to 52° C in 1 hr. Curds were "meaty" with no free-whey inside curd particles. Drained whey from curds and washed drained curds with successively colder water, drained last water, then drained further in a cheesecloth bag. Weight of draind curds was 367 g representing a yield of 18.8%. Moisture in curds was 71.3%. Calculated to an 80% moisture basis, weight of curds was 526.6 g. Yield was 27% or 2.39 lbs curd per lb NFMS.

EXAMPLE X

This example is a control experiment to determine cheese curd yield when a polyphosphate is not added.

A mixture of 1.2 g fumaric acid, 1.2 g citric acid and 0.8 g succinic anhydride was ground in a mortar to a fine powder. This powder was intimately mixed into 100 g of low heat, non-fat-milk-solids (skim milk powder).

To 1 qt of water at 24° C were added:
- 1.1 g monoammonium phosphate
- 1.1 g disodium phosphate
- 1.1 g monocalcium phosphate
- 0.5 g magnesium chloride.

The resulting water solution had a pH of 6.17. To the water solution, at 24° C, was added the pre-acidified non-fat-milk-solids mixture prepared above using vigorous mechanical agitation to obtain an acidified reconstituted skim milk having a pH of 5.0.

Warmed the milk to 32° C where it had a pH of 4.9. To the warm milk at 32° C added, with stirring, 4 g D-glucono-delta-lactone (acidogen) which had been dissolved in 20 ml of water. Then mixed 0.24 ml cottage cheese coagulator (dilute rennet extract, Hansen's) with 5 ml water and added this mixture to the warm skim milk. Stirred the mixture for 2 min to obtain a milk having a pH of 4.89. Allowed milk to set undisturbed for 1 hr at 32° C. A smooth, medium firm, normal cottage cheese curd formed.

Cut curd into ⅜ inch cubes. Whey exuded in a normal manner and had a pH of 4.7. Heated the cut curds, cooked and stirred for 25 min to a temperature of 53° C. Curds cooked and shrunk in a normal manner. Drained whey having a pH of 4.55. Washed curds 3 times with successively colder water; let drain. Weight of drained curds was 142 g representing a yield of 14.56% or 1.42 lbs curd per lb of NFMS. Moisture in curds was 79.2%. Calculated to 80% moisture, weight of curds was 147.7. Yield of 80% moisture cheese curd was 15.15% or 1.47 lbs curd per lb NFMS.

EXAMPLE XI

This example shows cheese curd yield is improved when a polyphosphate is added.

A mixture of 1.6 g fumaric acid and 1.6 g citric acid was ground in a mortar to a fine powder. This powder was intimately mixed into 57 g of non-fat-milk-solids (skim milk powder).

To 1 qt of water at 22° C were added:
- 1.2 g monoammonium phosphate
- 0.5 g monocalcium phosphate
- 0.6 g disodium phosphate
- 1.1 g sodium polyphosphate ("Vitrafos," Stauffer Chemical Co.).

The resulting water solution had a pH of 6.3.

To the water solution added, with stirring, 57 g of regular, unacidified, non-fat-milk-solids to obtain a reconstituted skim milk having a pH of 6.4.

To the reconstituted milk at 22° C added with vigorous mechanical agitation, the 57 g of pre-acidified non-fat-milk-solids prepared above to obtain an acidified, reconstituted skim milk having a pH of 5.13. Warmed the milk, with stirring, to 33° C where its pH was 5.15.

Dissolved 4 g acidogen (D-glucono-delta-lactone) in 20 ml water, added and stirred into the warmed skim milk. Then diluted 0.25 ml cottage cheese coagulator (dilute rennet extract, Hansen's) with 5 ml water, added to skim milk and stirred for 1 min. Allowed the milk to set undisturbed for 70 min. A firm, normal, cottage cheese curd formed.

Cut curd into ⅜ inch cubes. Whey exuded slightly slower than normal. They whey pH was 4.85. Warmed the cut curds, cooked and stirred to a temperature of 52° C. Curds firmed well, were heavy, settled easily and had no tendency to mat or stick together. Drained whey having a pH of 4.7. Washed curds 3 times with successively colder water and drained. Weight of drained curds was 190 g representing a yield of 17.9% or 1.66 lbs curd per 1 lb NFMS. Moisture in curd was 77.2%. Calculated to an 80% moisture basis, weight of curds was 216 g representing a yield of 20.3% or 1.89 lbs curd per 1 lb of NFMS.

EXAMPLE XII

This example shows cheese curd yield is further improved when additional polyphosphate is added.

A mixture of 1.6 g tartaric acid, 1.0 g citric acid and 0.6 g malic acid was ground in a mortar to a fine powder. This powder was intimately mixed with 57 g non-fat-milk-solids (skim milk powder).

To 1 qt of water at 18° C were added:
1.2 g monosodium phosphate
0.7 g monocalcium phosphate
0.5 ml of an anti-foam solution (food grade) and
2.1 g sodium polyphosphate ("Vitrafos," Stauffer Chemical Co.).

The resulting water solution had a pH of 5.65.

To the water solution was added, with stirring, 57 g of regular, unacidified, non-fat-milk-solids to obtain a reconstituted milk having a pH of 6.25.

Then added, with vigorous mechanical agitation, the 57 g of preacidified NFMS to the milk at 18° C to obtain an acidified, reconstituted skim milk having a pH of 5.12. Warmed the milk, with stirring, to 38° C where its pH was 5.17. Milk was rich in appearance, shiny, smooth, with no specks of precipitated casein.

Added 5 g of D-glucono-delta-lactone (acidogen) to the milk at 37° C and stirred for 1 min. Diluted 0.25 ml cottage cheese coagulator (dilute rennet extract, Hansen's) with 10 ml water, added to the milk and stirred for 1 min to obtain a skim milk having a pH of 5.1. Allowed the milk to set undisturbed at 37° C for 1 hr. A firm, smooth, cottage cheese curd formed.

Cut curd into $\frac{3}{8}$ inch cubes. Whey having a pH of 4.84 exuded easily. Warmed, cooked and stirred curds to a final temperature of 54° C. Drained whey having a pH of 4.54. Washed curds 3 times with successively colder water, then drained. Weight of drained curds was 237 g representing a yield of 22.36% or 2.08 l lbs curd per lb NFMS. Moisture in curd was 81.2%. Calculated to an 80% moisture basis, weight of curd was 222.8 g representing a yield of 21% or 1.95 lbs curd per lb of NFMS.

The foregoing yield values are well above an average calculated yield of 15.36% obtained by averaging yield figures for 15 vats of cultured cottage cheese and an average calculated yield of 1.66 lbs curd per lb of NFMS obtained by dividing lbs of cheese per 100 lbs of milk by the lbs of solids in 100 lbs of milk using the data in Table 2 on page 717 of the article entitled "Relation Between Certain Skimmilk Constituents and the Yield of Cottage Cheese" by Bender and Tuckey in J. Dairy Science, Volume 40, 713-721 (1957).

EXAMPLE XIII

This example shows that yield is increased, if polyphosphate is added to a vat of cheese milk, the milk is then acidified by adding a lactic-acid producing bacterial culture and making cottage cheese by the usual culturing method.

Into a cheese vat was pumped 86 gals of pasteurized skim milk at 27° C. Milk pH was 6.65; titratable acidity was 0.14% and total solids content was 8.65%.

Added, with stirring, 804 g of sodium polyphosphate ("Vitrafos," Stauffer Chemical Co.). Skim milk takes on a watery, pale appearance due to the polyphosphate altering the colloidal state of the calcium. (The normal white appearance returns as acid is produced and the calcium returns to its original colloidal state). Skim milk was warmed, with stirring, to 32° C. At 32° C, 5 gals of an actively growing, lactic-acid producing, bacterial starter was added and stirred in thoroughly. Milk was allowed to set for 1 hr to ripen, titratable acidity increased to 0.20% indicating the culture to be growing and unaffected by the added polyphosphate.

At this point, 20.5 ml of cottage cheese coagulator (dilute rennet extract, Hansen's), was diluted with 90 ml clean, cool water, added to the vat and stirred in thoroughly. Stirring was stopped and skim milk allowed to culture undisturbed.

In 5 $\frac{1}{2}$ hrs (from time of adding starter) the milk returned to its original white appearance, a medium soft cottage cheese type curd formed and the pH of some expressed whey was 4.75.

Curd was cut into $\frac{1}{4}$ inch cubes, using wire knives. Cut was clean, easy, slightly soft but curds did not break up.

Curd was allowed to settle and "heal" for 15 min.

Warm water was pumped through the cheese vat jacket and the cut curds were stirred gently and cooked in the usual manner to a temperature of 51° C.

Curds were firm, "meaty", of good texture and fine taste.

Whey, with a pH of 4.7, was drained from the curds.

Curds were washed with two water washes, first wash at 27° C and second, final, wash at 8° C.

Wash water was drained.

Curds were trenched in vat and allowed to drain.

Weight of drained curds was 118 lbs. Moisture in drained curds was 80.81%. Calculated to an 80% moisture basis the weight of curd was 113.22 lbs. Yield, based on 788 lbs total skim milk, was 14.37%, or on a solids basis, 1.66 lbs. curd per lb of NFMS.

A control vat of cultured cottage cheese was made, using the same herd milk, in the same equipment and by the same cheese maker.

Total solids in the control skim milk was 8.91%. From 828.7 lbs of this skim milk, with no polyphosphate added, 111.6 lbs of curd (corrected to 80% moisture) was obtained. Control yield was 13.5%, or on a solids basis, 1.51 lbs curd per lb of NFMS.

On a solids basis the increase in yield of the phosphate cheese curd compared to the control cheese curd was 9.9%.

While the invention has been described with reference to certain specific embodiments thereof, it is understood that it is not to be so limited since alterations and changes may be made therein which are within the full intended scope of the appended claims.

What is claimed is:

1. An acid cheese curd making process consisting essentially of
   A. adding a condensed phosphate salt in sufficient amount to increase cheese curd yield to milk before or after acidification, the pH after acidification being from about 4.95 to about 5.3 and the temperature before and after acidification being from about 5° C to about 40° C to obtain an acidified milk and condensed phosphate salt mixture; then B. maintaining the milk and salt mixture at about 26° C to about 40° C, with the proviso that if the milk and salt mixture is below 26° C, the mixture is heated to about 26° C to about 40° C, thereafter C. adding to the acidified milk and salt mixture to about 26° C to about 40° C from about 0.01 to about 0.05 parts by weight of proteolytic enzyme and, optionally, an acidogen in an amount up to about 0.5 parts by weight per 100 parts by weight of the acidified milk and salt mixture; and thereafter D. allowing the acidified milk and salt mixture to remain quiescent at a temperature of from about 26° C to about 40° C for from about 45 minutes to about 2 hours to form an acid cheese curd suitable for making cottage cheese, bakers' cheese, quark cheese, cream cheese and Neufchatel cheese.

2. A process according to claim 1 wherein the condensed phosphate salt is selected from the group consisting of pyrophosphate, metaphosphate, polyphosphate and ultraphosphate salts.

3. A process according to claim 1 with the additional steps of

E. cutting the acid cheese curd into cubes,

F. expressing whey from the curd,

G. cooking and stirring the curd for from about 30 minutes to about 90 minutes at a temperature of from about 38° C to about 66° C, and H. washing and draining the curd to obtain a cottage cheese curd.

4. A process according to claim 1 with the additional steps of

E. breaking up the cuttable acid cheese curd,

F. bagging the curd and expressing whey therefrom, and

G. hanging and draining the bagged curd for about 1 hour to help express further whey, to obtain a bakers' cheese curd.

5. A process according to claim 1 with the additional steps of

E. cutting the cuttable acid cheese curd,

F. cooking and stirring the curd until whey temperature reaches about 54° C and then continuing cooking for about 15 minutes additionally, G. cooling the curd to about 16° C, H. draining the curd overnight at about 3° C to obtain a dry, soft curd, and I. mixing the dry, soft curd with sufficient lactic acid to reduce pH of the curd to 4.6 and blending the curd into a smooth homogeneous cheese mass, with the proviso that the milk of step (A) is part milk and part cream so as to have a fat content of a. from about 5 to about 6 percent for the production of Neufchatel cheese, or b. from about 10.5 to about 11.5 percent for the production of cream cheese.

6. The process of claim 1 wherein the condensed phosphate salt is sodium polyphosphate.

7. The process of claim 1 wherein the condensed phosphate salt is potassium polymetaphosphate.

8. The process of claim 1 consisting essentially of adding from about 0.1 to about 0.4 parts by weight of sodium polyphosphate per 100 parts by weight of acidified milk having a pH of from about 4.95 to about 5.3 and a temperature of from about 5° C to about 40° C.

9. The process of claim 1 consisting essentially of adding from about 0.1 to about 0.4 parts by weight of potassium polymetaphosphate per 100 parts by weight of acidified milk having a pH of from about 4.95 to about 5.3 and a temperature of from about 5° C to about 40° C.

10. The process of claim 1 wherein the milk is acidified by bacterial culture.

11. The process of claim 1 wherein from about 0.2 to about 0.5 parts by weight of acidogen is added.

* * * * *